United States Patent [19]

Ashburn et al.

[11] 4,374,944

[45] Feb. 22, 1983

[54] ABS COMPOSITION CONTAINING COAL TAR PITCH

[75] Inventors: Donald G. Ashburn; Glendon T. Steady, both of Baton Rouge, La.

[73] Assignee: United States Steel Corporation, Pittsburgh, Pa.

[21] Appl. No.: 244,855

[22] Filed: Mar. 18, 1981

[51] Int. Cl.³ .............................................. C08L 95/00
[52] U.S. Cl. ........................................ 524/66; 428/36
[58] Field of Search ................. 260/28.5 AS, 28.5 B, 260/28.5 R; 106/273 R, 284; 524/66; 428/36

[56] References Cited

U.S. PATENT DOCUMENTS

| 2,331,979 | 10/1943 | Henderson | 260/28 |
|---|---|---|---|
| 2,501,123 | 3/1950 | Cox | 260/28.5 |
| 2,638,460 | 5/1953 | Crouch | 260/33.6 |
| 2,774,724 | 12/1956 | Watson | 196/142 |
| 2,779,745 | 1/1957 | Howland | 260/28.5 |
| 2,834,742 | 5/1958 | Scott et al. | 260/28.5 |
| 2,921,105 | 1/1960 | Benson | 260/758 |
| 2,921,313 | 1/1960 | Odasz, Jr. | 260/28.5 |
| 3,010,926 | 11/1961 | Odasz, Jr. et al. | 260/28.5 |
| 3,154,508 | 10/1964 | Clelland | 260/28.5 |
| 3,245,453 | 4/1966 | Barton et al. | 152/330 |
| 3,314,907 | 4/1967 | Fronczak | 260/28.5 |
| 3,361,692 | 1/1968 | Parkinson | 260/28.5 |
| 3,635,863 | 1/1972 | Drukker | 260/27 |
| 3,790,519 | 2/1974 | Wahlborg | 260/28.5 AS |
| 3,825,513 | 7/1974 | Rostler | 260/28.5 |
| 3,846,362 | 11/1974 | Reinecke et al. | 260/28.5 AS |
| 3,926,884 | 12/1975 | McColgan | 260/28.5 AS |
| 3,931,448 | 1/1976 | Parkinson | 428/451 |

Primary Examiner—Theodore E. Pertilla
Attorney, Agent, or Firm—W. Gary Goodson

[57] ABSTRACT

Coal tar pitch is blended with ABS (acrylonitrile-butadiene-styrene) molding or extrusion composition. The product produced therefrom is superior in some ways for applications such as pipe manufacture and meets generally accepted specifications therefor. Furthermore, such a product is less expensive than an ABS product without the coal tar pitch additive.

12 Claims, No Drawings

ABS COMPOSITION CONTAINING COAL TAR PITCH

BACKGROUND OF THE INVENTION

This invention relates to an improved ABS resinous plastic composition.

ABS resins are extremely popular for many uses because of their desirable physical properties and especially the high-impact strength, tensile strength, chemical resistance and heat resistance. One of the chief uses of ABS resins is for pipes, such as drain, waste and vent pipes.

One of the chief reasons that ABS plastics have not been used more widely is due to their relatively high cost, as compared to other plastics such as polyvinylchloride. In order to overcome the cost factor, there has been a major effort to incorporate various low cost filler materials in ABS compositions. Materials such as talc, calcium carbonate, and clay have been used to extend the material and reduce the overall cost per ton. One of the drawbacks of these materials has been that in many instances the reduction in cost has been achieved by substantial sacrifice in impact strength and other important properties.

Recently, asphalt has been utilized as an additive to ABS compositions to thereby lower the cost of the composition while not greatly reducing the impact strength and other key physical properties. Such an improved composition is taught in U.S. Pat. No. 3,926,884, incorporated herein by reference. However, even with the asphalt additive, it has been found from a commercial point of view that as the proportion of asphalt is increased above a very low level, such as 2% by weight, the impact strength and tensile strength begin to drop off rapidly. Thus, the amount of cost reduction that can be achieved through the use of asphalt as an additive to the ABS plastics is very limited.

SUMMARY OF THE INVENTION

This invention relates to an improved ABS composition containing coal tar pitch (CTP) which has been intimately blended with the ABS compound. It has been found that much larger proportions of coal tar pitch can be added to the ABS composition than was true with the asphalt additive, thereby providing significant increased cost reductions in the final ABS product cost. More particularly, impact strength and tensile strength of the product produced from ABS/CTP compositions can be maintained at acceptable levels at much higher levels of coal tar pitch. An additional unexpected benefit is that while the impact and tensile strength of composite products are being preserved at higher levels of coal tar pitch, the commercial processability is being enhanced due to a reduction in viscosity.

DESCRIPTION OF THE PREFERRED EMBODIMENTS

The coal tar pitch utilized in this invention is that commonly formed as a by-product of coal conversion processes such as coke making. Preferably, the coal tar pitch used in this invention has a Mettler softening point of between about 75° C. and about 120° C. (the ring and ball softening point that would be equivalent would be about 5° C. lower than the Mettler softening point).

The preferred ABS type resinous plastic composition is one comprising: polymerized acrylonitrile, butadiene and styrene constituting together at least about 50% of the composition by weight; and coal tar pitch intimately mixed with the polymerized acrylonitrile, butadiene and styrene and constituting up to 40% of the composition by weight. More preferably, the acrylonitrile, butadiene and styrene constitute together at least about 75% of the composition by weight.

In one preferred composition in accordance with this invention, the coal tar pitch makes up about 15% of the composition by weight. Another preferred composition is one containing between about 2 and about 10% by weight of pitch.

It should be recognized that the amount of pitch that can be utilized will depend upon the properties required in the final product for which the ABS composition is being used. Also, it will depend upon the type of ABS composition utilized. A higher butadiene ratio in the ABS composition may, for example, allow a greater level of coal tar pitch to be added to the ABS composition for a specific impact strength and/or tensile strength in the final product.

The following examples are given by way of illustration to show what results can be expected from the subject invention as compared to prior art ABS compositions containing asphalt.

EXAMPLES 1-16

A composition is formed of the following ingredients:

ABS Compound—a typical commercially available ABS compound having a high butadiene content as compared with standard formulations (32 parts butadiene, 13 parts acrylonitrile, and 55 parts styrene) and sold by USS Chemicals, Inc. as Kralastic W-1601.

EBS Wax—a synthetic wax lubricant (ethylene bisstearmide) sold by Glyco Chemical, Inc. as Acrawax C.

Asphalt 412—an air blown asphalt having a ring and ball softening point of 116° to 121° C. and sold by Witco Chemical as Pioneer 412.

Coal Tar Pitch—coal tar pitch having a Mettler softening point of 105° C. to 110° C. sold by USS Chemicals, Inc.

Carbon Black—a standard product sold by Cabot Corporation as Regal 300.

The ingredients in the proportions indicated below are fed into an intensive melt mixer and mixed therein for approximately 3 minutes at a temperature of approximately 200° C. The resultant intimate mixture was pelletized, and then molded in an injection molding machine at a temperature of about 215° C., and under sufficient pressure to effect the molding operation. The molded products in the form test specimens were found to have the physical properties indicated below.

It should be noted that the examples are taken from data which was not performed at the same time and under the exact same conditions. Therefore, the data should be compared to the control in each grouping to understand relative performance. For example, the data upon which Examples 1 and 2 are based was generated as part of one study. The data upon which Examples 3 and 4 are based was generated as part of a different study. Therefore, Examples 1 and 3 cannot be directly compared. However, the changed physical properties by adding asphalt to the Example 1 formulation and coal tar pitch to the Example 3 formulation does provide a basis for comparison.

| Ingredients (parts by weight) | Example No. | | | |
|---|---|---|---|---|
| | 1 | 2 | 3 | 4 |
| ABS Compound | 100 | 90 | 100 | 100 |
| EBS Wax | 1.7 | 1.7 | 0.5 | 0.5 |
| Carbon Black | 1.0 | — | — | — |
| Asphalt 412 | — | 10 | — | — |
| Cold Tar Pitch | — | — | — | 10 |
| Physical Properties | | | | |
| Tensile Strength (psi) (ASTM, D638) | 4799 | 4580 | 5082 | 5585 |
| Cupillary Rheometer Flow (poise × 10$^3$) (400° F. and 4.1 sec$^{-1}$) | 288 | 283 | 242 | 192 |
| Drop Weight Impact (@ −20° F.) (in.lbs) (1/2" dia. dart/5/8" anvil) | 160 | 40 | 120 | 20 |

A comparison of the physical properties of Examples 1-4 shows that the addition of 10% asphalt (Example 2) to the formulation of Example 1 results in decreased Tensile Strength and Drop Weight Impact whereas Rheometer Flow stays roughly the same. By contrast, the addition of 10% coal tar pitch (Example 4 to the formulation of Example 3) results in improved Tensile Strength and Rheometer Flow whereas the Drop Weight Impact Decreases. Thus, these examples indicate that the use of coal tar pitch in place of the same amount of asphalt as a filler in ABS plastics gives improved physical properties. Examples 5 to 16 raise a question as to how valid the results are in Examples 1-4 as they relate to Drop Weight Impact Strength.

| Ingredients (parts by weight) | Example No. | | | | | |
|---|---|---|---|---|---|---|
| | 5 | 6 | 7 | 8 | 9 | 10 |
| ABS Compound | 100 | 100 | 100 | 100 | 100 | 100 |
| EBS Wax | 0.5 | 0.5 | 0.5 | 1.0 | 1.0 | 1.0 |
| Carbon Black | 0.5 | — | — | 1.7 | 0.5 | — |
| Asphalt 412 | 2 | 5 | 10 | — | — | — |
| Cold Tar Pitch | — | — | — | — | 2 | 5 |
| Physical Properties | | | | | | |
| Tensile Strength (psi) (ASTM, Part 35, Test D638) | 4911 | 4504 | 4186 | 5245 | 5231 | 5257 |
| Cupillary Rheometer Flow (poise × 10$^3$) (400° F.) | 205 | 174 | 175 | — | — | — |
| Drop Weight Impact (@ −20° F.) (in.lbs) (1/2" dia. dart/5/8" anvil) | 160 | 70 | 60 | 120 | 120 | 120 |

A comparison of Examples 5-10 shows that at the addition of coal tar pitch, the level of 2 and 5 parts by weight per 100 parts of ABS compound gives much improved Tensile Strength and less reduction of Drop Weight Impact Strength as compared to ABS formulations containing the same level of asphalt. This clearly indicates that an ABS product having a certain specified Tensile and Drop Weight Impact Strength can be obtained with much higher levels of coal tar pitch present in the product than can be obtained from an equivalent level of asphalt in the product.

| Ingredients (parts by weight) | Example No. | | | | | |
|---|---|---|---|---|---|---|
| | 11 | 12 | 13 | 14 | 15 | 16 |
| ABS Compound | 100 | 100 | 100 | 100 | 100 | 100 |
| EBS Wax | — | — | — | — | — | — |
| Carbon Black | — | — | — | — | — | — |
| Asphalt 412 | — | 2 | 5 | — | — | — |
| Cold Tar Pitch | — | — | — | — | 2 | 5 |
| Physical Properties | | | | | | |
| Tensile Strength (psi) (ASTM, Part 35, Test D638) | 4732 | 4911 | 4564 | 5245 | 5231 | 5247 |
| Cupillary Rheometer Flow (poise × 10$^3$) (400° F. and 4.1 sec$^{-1}$) | — | — | — | — | — | — |
| Drop Weight Impact (@ −20° F.) (in.lbs) (1/2" dia. dart/5/8" anvil) | 160 | 160 | 70 | 120 | 120 | 100 |

A comparison of Examples 11-16 shows improved Tensile Strength and lessened reduction in impact strength of the Coal Tar Pitch containing ABS Product versus the Asphalt containing ABS Product at the level of 5 parts of pitch or asphalt per 100 parts of ABS compound. Thus, the addition of higher levels of coal tar pitch than asphalt is clearly possible to achieve an ABS Product with a specified minimum Tensile Strength and Drop Weight Impact Strength.

We claim:

1. An extended ABS type resinous plastic composition consisting essentially of:
   (a) polymerized acrylonitrile, butadiene and styrene constituting together at least about 50 percent of the composition by weight; and
   (b) coal tar pitch intimately mixed with said polymerized acrylonitrile, butadiene and styrene and constituting up to about 40 percent of said composition by weight.

2. Composition as in claim 1, in which said polymerized acrylonitrile, butadiene and styrene constitute together at least about 75 percent of the composition by weight.

3. Composition as in claim 1 where said coal tar pitch constitutes between about 2 percent and about 10 percent of said composition.

4. Cured product having the composition of claim 1.

5. Cured product having the composition of claim 3.

6. Cured product of claim 5 in the form of a pipe.

7. An extended ABS type resinous plastic composition suitable for use in making pipe having high impact strength, tensile strength, and chemical resistance comprising:
   polymerized acrylonitrile, butadiene and styrene constituting together at least about 50 percent of the composition by weight; and
   coal tar pitch intimately mixed with said polymerized acrylonitrile, butadiene and styrene and constituting between 2 and 15 percent of the composition by weight: said coal tar pitch having a Mettler softening point in the range of about 75° C. to about 120° C.

8. Composition as in claim 7, in which said polymerized acrylonitrile, butadiene and styrene and constitute together at least about 75 percent of the composition by weight.

9. Composition as in claim 7 where said coal tar pitch constitutes between about 2 percent and about 10 percent of said composition.

10. Cured product having the composition of claim 7.

11. Cured product having the composition of claim 9.

12. Cured product of claim 11 in the form of a pipe.

* * * * *